United States Patent
Torres et al.

(10) Patent No.: US 11,956,071 B2
(45) Date of Patent: Apr. 9, 2024

(54) SYSTEMS AND METHODS FOR SYNCHRONOUS AND ASYNCHRONOUS MESSAGING

(71) Applicant: Verizon Patent and Licensing Inc., Basking Ridge, NJ (US)

(72) Inventors: Randolph Torres, Clermont, FL (US); Ralph Stagg, Wyle, TX (US); Michael T. Bayne, Wesley Chapel, FL (US); Sutap Chatterjee, Tampa, FL (US); Tri Bui, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 50 days.

(21) Appl. No.: 17/687,363

(22) Filed: Mar. 4, 2022

(65) Prior Publication Data
US 2023/0283391 A1    Sep. 7, 2023

(51) Int. Cl.
H04J 3/06 (2006.01)

(52) U.S. Cl.
CPC ............ H04J 3/065 (2013.01); H04J 3/0667 (2013.01)

(58) Field of Classification Search
CPC ................................. H04J 3/065; H04J 3/0667
See application file for complete search history.

(56) References Cited

U.S. PATENT DOCUMENTS

| | | | |
|---|---|---|---|
| 7,007,088 B1* | 2/2006 | Najmi | H04L 51/234 709/224 |
| 9,716,634 B2* | 7/2017 | Sapuram | H04L 41/5096 |
| 9,852,220 B1* | 12/2017 | Guo | G06F 16/258 |
| 2004/0078105 A1* | 4/2004 | Moon | G06Q 10/10 700/100 |
| 2006/0067252 A1* | 3/2006 | John | G06Q 10/06 370/261 |
| 2006/0080394 A1* | 4/2006 | Goodman | H04L 63/101 709/206 |
| 2008/0052313 A1* | 2/2008 | Keen | G16H 30/40 |
| 2010/0057757 A1* | 3/2010 | Blondi | G06F 9/5038 709/223 |
| 2010/0228849 A1* | 9/2010 | Moore | G06F 9/54 709/224 |
| 2012/0095936 A1* | 4/2012 | Moyse | G06Q 40/00 705/36 R |

(Continued)

*Primary Examiner* — Bailor C Hsu

(57) ABSTRACT

An example method includes receiving a message from a sending service and addressed to a destination service. The message is sent to the destination service using a synchronous message modality responsive to a communication history parameter for the destination service indicating a synchronous message type. The message is sent to the destination service using an asynchronous message modality responsive to the communication history parameter indicating an asynchronous message type. A reply is received from the destination service and the reply is sent to the sending service. The synchronous message modality comprises waiting for a reply to be received from the destination service for a predetermined time interval. The asynchronous message modality comprises storing identification data associated with the message in a correlation data store, receiving the reply from the destination service, and determining whether the reply is associated with the message based on the identification data.

20 Claims, 9 Drawing Sheets

(56) References Cited

U.S. PATENT DOCUMENTS

| | | | |
|---|---|---|---|
| 2012/0278513 A1* | 11/2012 | Prevost | H04L 67/60 710/39 |
| 2013/0191481 A1* | 7/2013 | Prevost | H04L 51/04 709/206 |
| 2014/0074905 A1* | 3/2014 | Schincariol | H04L 67/10 709/201 |
| 2014/0282536 A1* | 9/2014 | Dave | G06Q 30/0631 718/1 |
| 2015/0067028 A1* | 3/2015 | Kumar | H04L 67/10 709/203 |
| 2017/0255886 A1* | 9/2017 | Schmidt | G06Q 10/0633 |

\* cited by examiner

SYSTEMS AND METHODS FOR SYNCHRONOUS AND ASYNCHRONOUS MESSAGING

BACKGROUND

Large entities commonly use multiple data systems for project management. A project management system may be used to manage projects and coordinate with various independent systems related to functions within the project, such as planning deployments, engineering, construction, government permitting, purchasing, network deployment, third party negotiations, or other project management tasks. However, project management using multiple data systems provides challenges with respect to project management timelines, redesign, and error handling.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
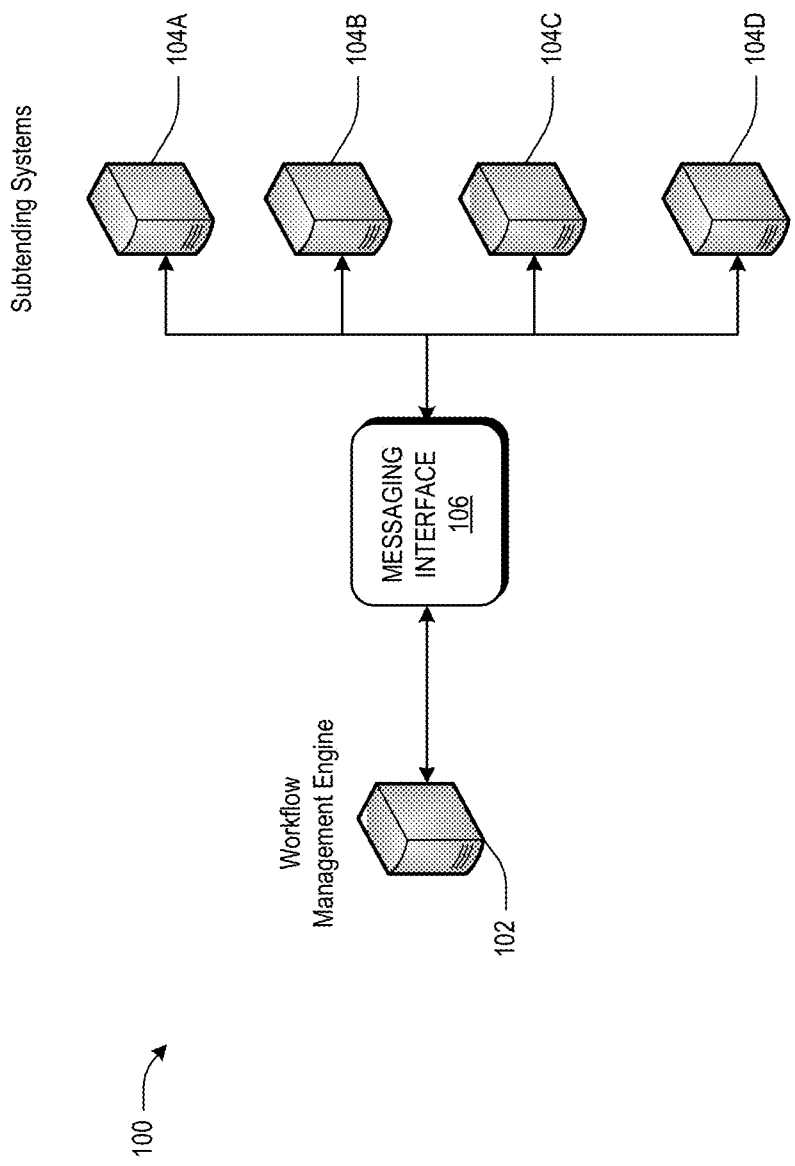
FIG. 1 is a diagram of a project management system, according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

In some instances, an entity may use multiple data systems for project management. A project management system may be used to manage projects and coordinate with various independent systems related to functions within the project, such as planning deployments, engineering, construction, government permitting, purchasing, network deployment, third party negotiations, or other project management tasks. The project management system may include a workflow engine to execute tasks related to project management, which may require interfacing with the remote systems to execute such tasks. A messaging interface is used to communicate between the workflow engine and the independent systems. The messaging interface employs a synchronous message modality for messages from the sending service, such as the workflow engine, that are expected to be responded to in a relatively short time frame by the destination service, i.e., the independent system. For messages that are expected to take longer to generate a response, or that are to be sent to destination services that may not always be available to reply, the messaging interface employs an asynchronous message modality. In some embodiments, the messaging interface tracks communication history data for the destination services to select between synchronous and asynchronous message modalities.

Embodiments described herein include a communication system. The system includes a decision/response module configured to receive a first message from a sending service and addressed to a first destination service, determine a communication history parameter for the first message, and send a first reply from the first destination service to the sending service responsive to receiving the first reply, a synchronous communication module configured to receive the first message from the decision/response module responsive to the communication history parameter indicating a synchronous message type, send the first message to the first destination service, send the first reply to the response module responsive to receiving the first reply from the first destination service within a first predetermined time interval, and identify a first error condition responsive to not receiving the first reply from the first destination service within the first predetermined time interval, and an asynchronous communication module configured to receive the first message from the decision/response module responsive to the communication history parameter indicating an asynchronous message type, store first identification data associated with the first message in a correlation data store, receive the first reply from the first destination service, determine whether the first reply is associated with the first message based on the identification data, and send the first reply to the response module responsive to determining that the first reply is associated with the first message.

In a further aspect of the system, the synchronous communication module is configured to store the first message in a retry data store responsive to identifying the first error condition, and the system comprises a retry handler configured to retrieve the first message from the retry data store, generate a retry tracking parameter for the first message, and resend the first message to the decision/response module based on the retry tracking parameter.

In a further aspect of the system, the retry handler is configured to send a fault message to the response module based on the retry tracking parameter indicating a predetermined number of retry failures, and the response module is configured to send the fault message to the sending service.

In a further aspect of the system, the decision/response module comprises an endpoint profile model indicating communication metrics for the first destination service, and the synchronous communication module is configured to send the first error condition to the decision/response module.

In a further aspect of the system, the asynchronous communication module is configured to identify a second error condition and store the first message a retry data store responsive to not receiving an acknowledge receipt from the first destination service regarding receipt of the first message, and the system comprises a retry handler configured to retrieve the first message from the retry data store, generate a retry tracking parameter for the first message, and resend the first message to the decision/response module based on the retry tracking parameter.

In a further aspect of the system, the retry handler is configured to send a fault message to the response module based on the retry tracking parameter indicating a predetermined number of retry failures, and the response module is configured to send the fault message to the sending service.

In a further aspect of the system, the decision/response module comprises an endpoint profiler configured to generate a communication metric for the first destination service, the asynchronous communication module is configured to send the second error condition to the endpoint profiler, and the endpoint profiler is configured to update the communication metric for the first destination service based on the first error condition.

In a further aspect of the system, the decision/response module comprises an endpoint profiler configured to generate a communication metric for the first destination service, the asynchronous communication module is configured to a first communication successful indicator to the endpoint profiler responsive to receiving an acknowledge receipt from the first destination service regarding receipt of the first message, the synchronous communication module is configured to a second communication successful indicator to the endpoint profiler responsive to receiving an acknowledge receipt from the first destination service regarding receipt of the first message, and the endpoint profiler is configured to update the communication metric for the first destination service based on at least one of the first communication successful indicator or the second communication successful indicator.

Embodiments described herein also include a method. The method includes receiving a first message from a sending service and addressed to a first destination service, determining a communication history parameter for the first destination service, sending the first message to the first destination service using a synchronous message modality responsive to the communication history parameter indicating a synchronous message type, sending the first message to the first destination service using an asynchronous message modality responsive to the communication history parameter indicating an asynchronous message type, receiving a first reply from the first destination service, and sending the first reply to the sending service, wherein sending the first message to the first destination service using the synchronous message modality comprises waiting for a first reply to be received from the first destination service for a predetermined time interval, and sending the first message to the first destination service using the asynchronous message modality comprises storing first identification data associated with the first message in a correlation data store, receiving the first reply from the first destination service, and determining whether the first reply is associated with the first message based on the identification data.

Further aspects of the method include storing the first message in a retry data store responsive to at least one of failing to receive the first reply from the first destination service within the predetermined time interval using the synchronous message modality or failing to receive an acknowledge receipt from the first destination service regarding receipt of the first message using the asynchronous message modality, retrieving the first message from the retry data store, generating a retry tracking parameter for the first message, and resending the first message to the first destination service based on the retry tracking parameter and the communication history parameter.

Further aspects of the method include updating the communication history parameter prior to resending the first message to the first destination service.

In a further aspect of the method, determining the communication history parameter for the first message comprises employing an endpoint profile model indicating communication metrics for the first destination service to determine the communication history parameter for the first message, and the method comprises updating the endpoint profile model based on successful communications or unsuccessful communications using the synchronous message modality.

In a further aspect of the method, determining the communication history parameter for the first message comprises employing an endpoint profile model indicating communication metrics for the first destination service to determine the communication history parameter for the first message, and the method comprises updating the endpoint profile model based on successful communications or unsuccessful communications using the asynchronous message modality.

Further aspects of the method include identifying a first error condition responsive to not receiving the first reply from the first destination service within the first predetermined time interval while using the synchronous message modality, and sending the first error condition to the sending service.

Further aspects of the method include identifying a first error condition responsive to not receiving an acknowledge receipt from the first destination service regarding receipt of the first message, and sending the first error condition to the sending service.

Embodiments described herein also include a non-transitory computer-readable medium, storing instructions thereon that when executed by a processor cause the processor to receive a first message from a sending service and addressed to a first destination service, determine a communication history parameter for the first message, send the first message to the first destination service using a synchronous message modality responsive to the communication history parameter indicating a synchronous message type, send the first message to the first destination service using an asynchronous message modality responsive to the communication history parameter indicating an asynchronous message type, receive a first reply from the first destination service, and send the first reply to the sending service, wherein sending the first message to the first destination service using the synchronous message modality comprises waiting for a first reply to be received from the first destination service for a predetermined time interval, and sending the first message to the first destination service using the asynchronous message modality comprises storing first identification data associated with the first message in a correlation data store, receiving the first reply from the first destination service, and determining whether the first reply is associated with the first message based on the identification data.

Further aspects of the non-transitory computer-readable medium include instructions that cause the processor to store the first message in a retry data store responsive to at least one of failing to receive the first reply from the first destination service using the synchronous message modality or failing to receive an acknowledge receipt from the first destination service regarding receipt of the first message using the asynchronous message modality, retrieve the first message from the retry data store, generate a retry tracking parameter for the first message, and resend the first message to the first destination service based on the retry tracking parameter and the communication history parameter.

Further aspects of the non-transitory computer-readable medium include instructions that cause the processor to determine the communication history parameter for the first message by employing an endpoint profile model indicating communication metrics for the first destination service to determine the communication history parameter for the first message, update the endpoint profile model based on successful communications or unsuccessful communications using the synchronous message modality, and update the endpoint profile model based on successful communications or unsuccessful communications using the asynchronous message modality.

Further aspects of the non-transitory computer-readable medium include instructions that cause the processor to identify a first error condition responsive to not receiving the first reply from the first destination service within a first predetermined time interval while using the synchronous message modality, and send the first error condition to the sending service.

Further aspects of the non-transitory computer-readable medium include instructions that cause the processor to identify a first error condition responsive to not receiving an acknowledge receipt from the first destination service regarding receipt of the first message, and send the first error condition to the sending service.

FIG. 1 is a diagram of a project management system 100, according to some embodiments. The project management system 100 comprises a workflow management engine 102 communicating with independent systems 104A, 104B, 104C, 104D via a messaging interface 106. With respect to the messaging interface 106, the workflow management engine 102 acts as a sending service for sending requests, and the independent systems 104A, 104B, 104C, 104D act as destination services that receive the requests and generate reply messages. Example workflow management engines include PEGA® PLATFORM, RED HAT® PAM, jBPM, or other suitable platforms. The independent systems 104A, 104B, 104C, 104D may comprises systems provided for various tasks within the project management framework, such as planning deployments, engineering, construction, government permitting, purchasing, network deployment, third party negotiations, or other project management tasks. In some embodiments, the messaging interface 106 employs a synchronous message modality for short term messages and an asynchronous message modality for long term messages or those destined for less responsive independent systems 104A, 104B, 104C, 104D.

Figure 2:
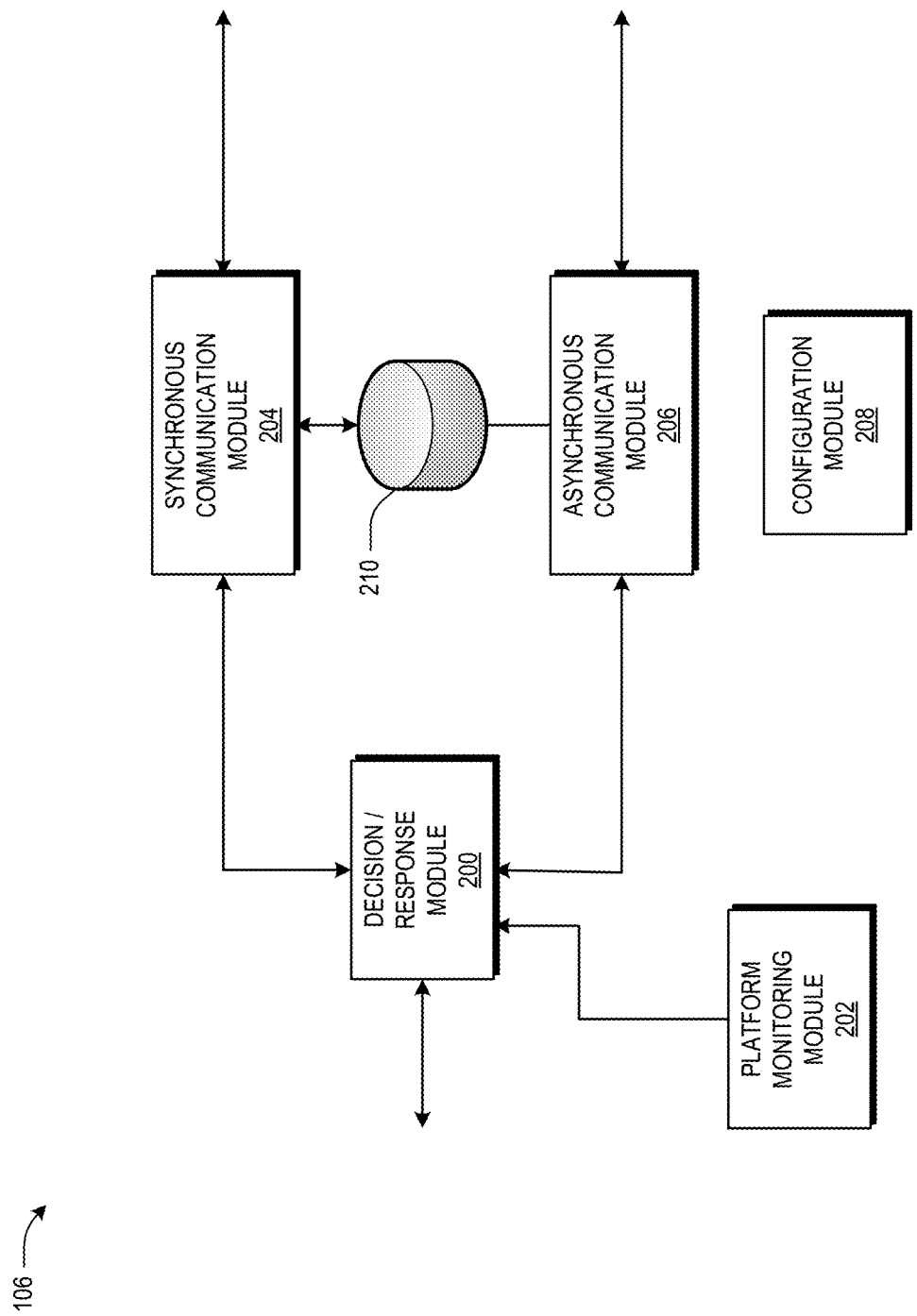
FIG. 2 is a diagram of a messaging interface, according to some embodiments.

FIG. 2 is a diagram of the messaging interface 106, according to some embodiments. In some embodiments, the messaging interface 106 comprises a decision/response module 200, a platform monitoring module 202, a synchronous communication module 204, an asynchronous communication module 206, a configuration module 208, and a data store 210. The decision/response module 200 receives incoming messages, such as from the workflow management engine 102, addressed to one of the independent systems 104A, 104B, 104C, 104D. The platform monitoring module 202 tracks communication history data associated with the independent systems 104A, 104B, 104C, 104D. The decision/response module 200 accesses the platform monitoring module 202 to determine a communication history parameter for deciding whether communication with a particular independent system 104A, 104B, 104C, 104D, should be synchronous or asynchronous. The configuration module 208 allows a user to interface with the project management system 100 to allow various settings to be managed. The configuration module 208 may include a user interface that allows the settings to be viewed and managed.

Certain independent systems 104A, 104B, 104C, 104D may tend to respond quickly to messages from the workflow management engine 102. In such cases, a synchronous message modality is used, and the decision/response module sends the message to the synchronous communication module 204. In a synchronous message modality, the synchronous communication module 204 receives the message from the decision/response module 200, sends the message to the destination service, and waits for a reply message. Other communication to the destination service may be paused while the synchronous communication module 204 waits for the reply.

Other independent systems 104A, 104B, 104C, 104D may be slow to respond, either as expected due to normal workflow for that destination service, or due to current disturbances associated with the destination service. For example, if the destination service associated with the message may be expected to take days, weeks, or months to complete prior to a response being generated, a quick response is not expected. In such cases, an asynchronous message modality may be used, and the decision/response module 200 sends the message to the asynchronous communication module 206. In an asynchronous message modality, the asynchronous communication module 206 receives the message from the decision/response module 200 and sends the message to the destination service, but does not wait for the reply message. The destination service sends an acknowledgment receipt indicating receipt of the message, but does not immediately send the reply message. The asynchronous communication module 206 stores identification data about the message in the data store 210, such as time stamp, destination ID, or other suitable identification data, so that when the reply message eventually comes, the messaging interface 106 can correlate the reply message with the original message.

Figure 3A:
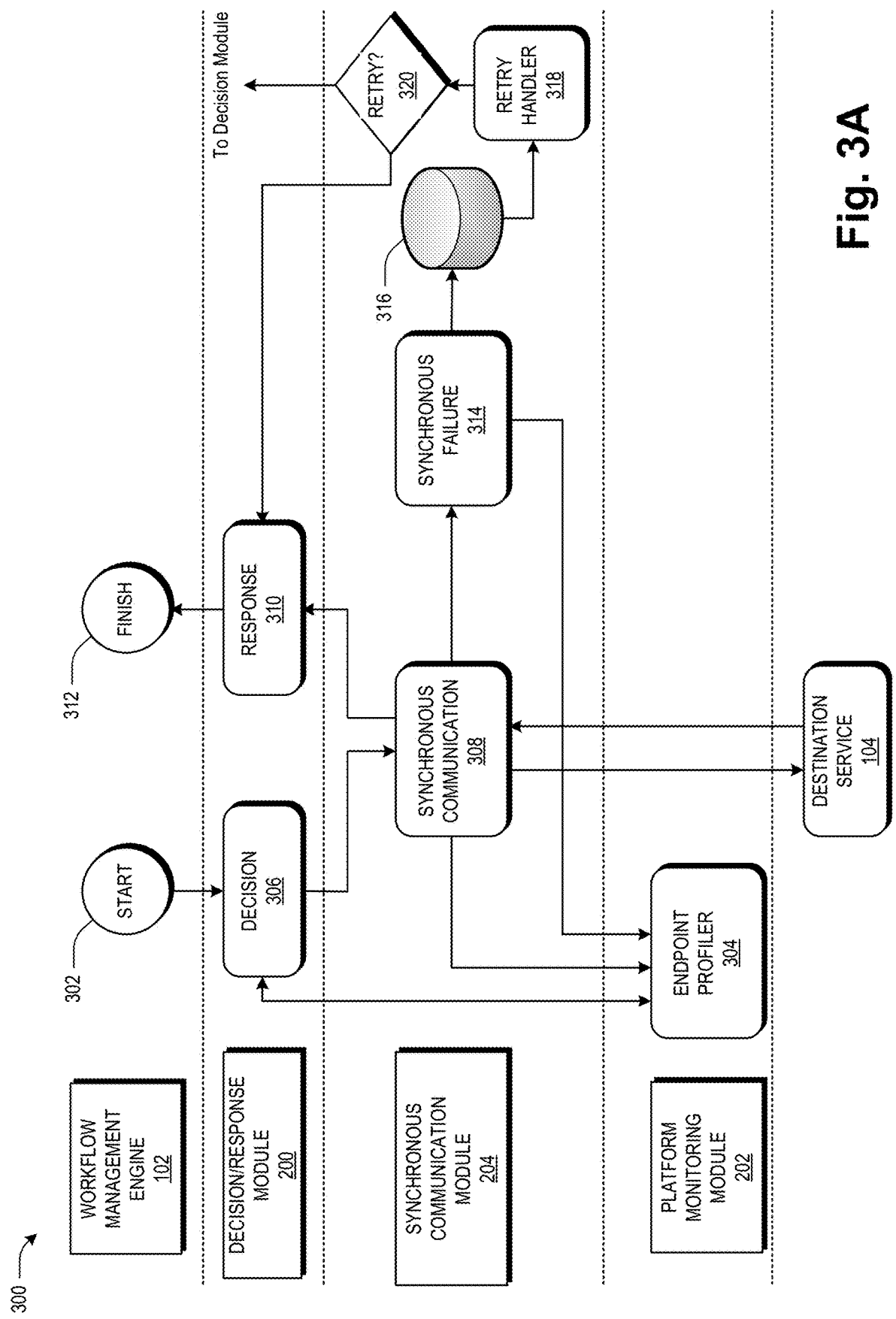
FIG. 3A is a diagram of a synchronous message flow, according to some embodiments.

FIG. 3A is a diagram of a synchronous message flow 300, according to some embodiments. The workflow management system starts the message flow 300 at block 302 by sending a message. The decision/response module 200 interfaces with the platform monitoring module 202 to obtain information on the destination system via an endpoint profiler at block 304, and the decision/response module 200 generate a decision at block 306 to communicate using the synchronous communication module 204. For example, the platform monitoring module 202 may provide a communication history parameter indicating that previous synchronous message attempts with the destination system have been reliable, supporting the use of a synchronous messaging modality. The synchronous communication module 204 receives the message and sends the message to the destination service at block 308. The synchronous communication module 204 waits for the reply message. If the reply message is received, for example within a predetermined time interval, the synchronous communication module 204 forwards the reply message at block 308 as a response at block 310. An indicator of the successful communication is sent by the synchronous communication module 204 to the platform monitoring module 202 to update the endpoint profiler at block 304. The reply message is sent to the workflow management engine 102 and the communication flow terminates at block 312. If a reply message is not received, either due to the destination service 104 responding with an error or due to the predetermined time interval elapsing, the synchronous communication module 204 generates an error condition and records a synchronous failure at block 314. The synchronous communication module 204 stores a retry message in a retry data store 316, which may be a module in the data store 210. The synchronous communication module 204 implements a retry handler at block 318 to retrieve the retry message from the retry data store 316 and generate a retry decision at block 320. In some embodiments, the synchronous communication module 204 retries the message for a predetermined number of times. The retry handler generates a retry handling parameter that indicates the number of retry attempts, if the number of retry attempts is less than a retry threshold, the retry handler reissues the message to the decision/response module 200. If the number of retry attempts exceeds the retry threshold, a fault message indicating the retry failure is sent to the decision/response module 200 at block 310 and the fault message is sent to the workflow management engine 102 at block 312. The synchronous communication module 204 sends the retry failure at block 314 to the endpoint profiler at block 304 to allow the platform monitoring module 202 to update the history for the destination service. In some embodiments, the timer intervals and retry thresholds may be configured or modified using the configuration module 208.

Figure 3B:
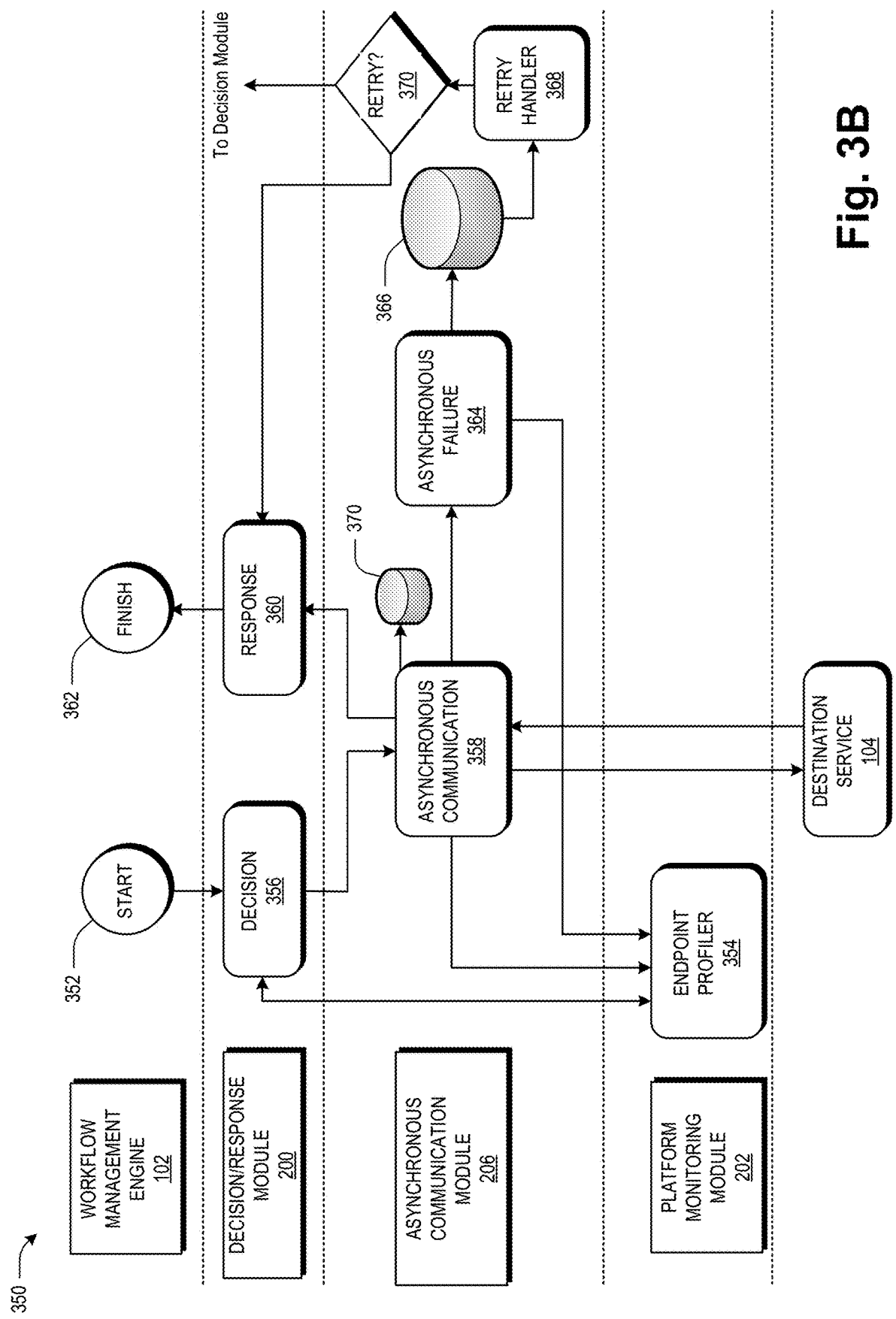
FIG. 3B is a diagram of an asynchronous message flow, according to some embodiments.

FIG. 3B is a diagram of an asynchronous message flow, according to some embodiments. The workflow management system starts the message flow 300 at block 352 by sending a message. The decision/response module 200 interfaces with the platform monitoring module 202 to obtain information on the destination system via an endpoint handler at block 354, and the decision/response module 200 generate a decision at block 356 to communicate using the asynchronous communication module 206. For example, the platform monitoring module 202 may provide a communication history parameter indicating that previous synchronous message attempts with the destination system have not been reliable, supporting the use of an asynchronous messaging modality. The asynchronous communication module 206 receives the message and sends the message to the destination service at block 358. The asynchronous communication module 206 waits for an acknowledge receipt message. If the acknowledge receipt message is received, for example within a predetermined time interval, the asynchronous communication module 206 forwards the acknowledge receipt message at block 358 as a response at block 360. An indicator of the successful communication is sent by the synchronous communication module 204 to the platform monitoring module 202 to update the endpoint profiler at block 354. The acknowledge receipt message is sent to the workflow management engine 102 at block 360. The asynchronous communication module 206 stores identification data for the message in a correlation data store 370, which may be a module in the data store 210, that identifies the message so that it can be later correlated with a reply message at block 365. Example identification data used for correlation includes workflow ID (identifying the particular workflow being used), workflow instance ID (identifying the particular instance of the workflow issuing the message), task instance ID (identifying the particular task in the workflow issuing the message), or some other suitable correlation data. In some embodiments, the asynchronous communication module 206 generates a correlation token that combines the individual correlation data elements. The communication flow terminates at block 362.

If the acknowledge receipt message in not received, either due to the destination service 104 responding with an error or due to the predetermined time interval elapsing, the asynchronous communication module 206 generates an error condition and records an asynchronous failure at block 364. The asynchronous communication module 206 stores a retry message in a retry data store 366, which may be a module in the data store 210. The asynchronous communication module 206 implements a retry handler at block 368 to retrieve the retry message from the retry data store 366 and generate a retry decision at block 372. In some embodiments, the asynchronous communication module 206 retries the message for a predetermined number of times. The retry handler generates a retry handling parameter that indicates the number of retry attempts, if the number of retry attempts is less than a retry threshold, the retry handler reissues the message to the decision/response module 200. If the number of retry attempts exceeds the retry threshold, a fault message is sent to the decision/response module 200 at block 360 and the fault message is sent to the workflow management engine 102. The synchronous communication module 204 message indicating the retry failure at block 364 to the endpoint profiler to allow the platform monitoring module 202 to update the history for the destination service. In some embodiments, the timer intervals and retry thresholds may be configured or modified using the configuration module 208.

At a later point in time, the destination service 104 sends a reply message to the asynchronous communication module 206. The asynchronous communication module 206 accesses the correlation data store 370 at block 358 to correlate the reply message to the original message. In some embodiments, the asynchronous communication module 206 matches the correlation token of the reply message to the corresponding correlation token for the original message to associate the reply message with the original message. The asynchronous communication module 206 sends the reply message to the decision/response module at block 360 for forwarding to the workflow management engine 102 and the flow terminates at block 362.

In some embodiments, the platform monitoring module 202 employs the endpoint profiler to generate a weighted measure that tracks the success of previous synchronous calls that are made to that destination service. A successful call earns a positive weight, and a failure gets a negative weight. The decision/response module 200 makes a decision to access the destination service synchronously if the sum of all weights is positive. Each destination service is assigned a default positive weight (deadweight). If a particular destination service is never to be accessed using synchronous calls, the deadweight can be set to zero for that destination service. Weights for past synchronous calls are proportional the age of the call. The further in the past the call is, the lesser the weight. Weights are calculated by using the formula:

(1−(elapsed time since call/scaling factor for the destination service)).

Negative numbers are ignored and assigned a weight of 0. Therefore, any destination service will have two parameters—the deadweight and the scaling factor. The scaling factor defines the sliding time window used for evaluating previous calls. The deadweight sets the elapsed time that needs to pass before the platform monitoring module 202, having previously switched from recommending synchronous modality to recommending asynchronous modality, tries to revert back to the synchronous modality. Due to the updating of the endpoint profiler for errors or faults, a message that is initially sent as a synchronous message may transition to an asynchronous message upon retry if the negative weight associated with the failure is sufficient to change the weighted measure for the destination service from one that recommends a synchronous modality to one that recommends an asynchronous modality. In some embodiments, the deadweights and the scaling factors for the destination service 104 may be configured or modified using the configuration module 208.

In some embodiments, the workflow management engine 102 or a user may request status on a particular workflow or task, and the messaging interface 106 may access the data store 210 to return status information, such as time elapsed since the message associated with the workflow or task was sent, number of retries, or some other status parameter. Retrieving status from the messaging interface 106 allows the status to be determined without sending an additional message to the destination service, such as when the destination service is offline. In some embodiments, the user interface of the configuration module 208 is used to request status information regarding messages pending in the messaging interface 106.

Figure 3C:
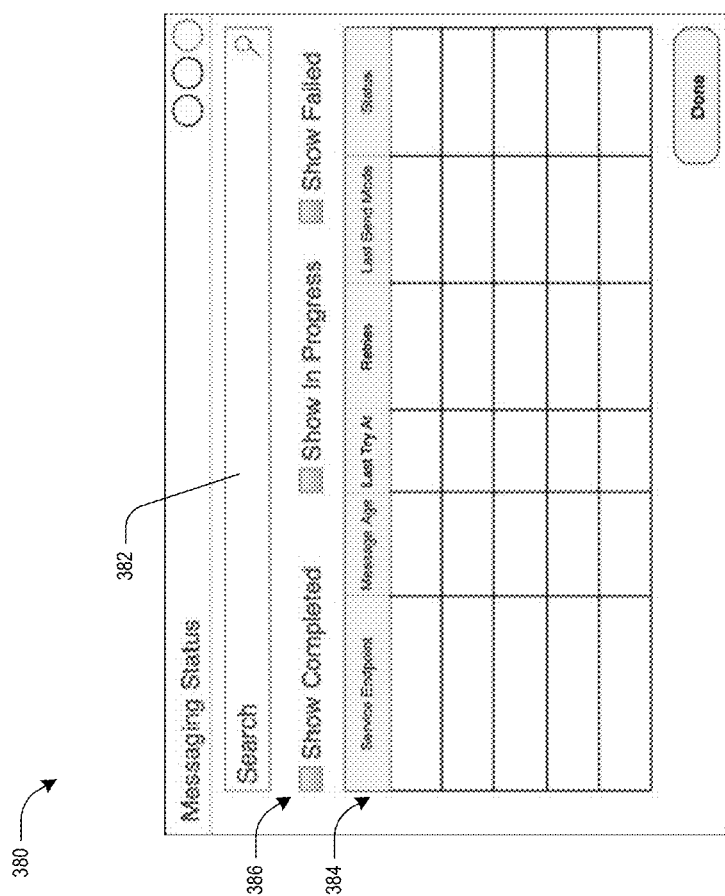
FIG. 3C a diagram of a user interface, according to some embodiments.

Referring to FIG. 3C a diagram of a user interface 380 is provided, in accordance with some embodiments. In some embodiments, the user interface comprises a query field 382 where a user may enter a workflow ID task ID, or some other identification parameter. The configuration module 208 generates a table 384 listing status data, such as service endpoint, message age, last try timestamp, number of retries, last send mode (asynchronous or synchronous), status, or other suitable fields. In some embodiments, filter buttons 386 are provided to allow the user to filter data, such as for completed messages, in progress messages, or failed messages. Other structures and configurations of the user interface 380 are within the scope of the present disclosure.

Figure 4:
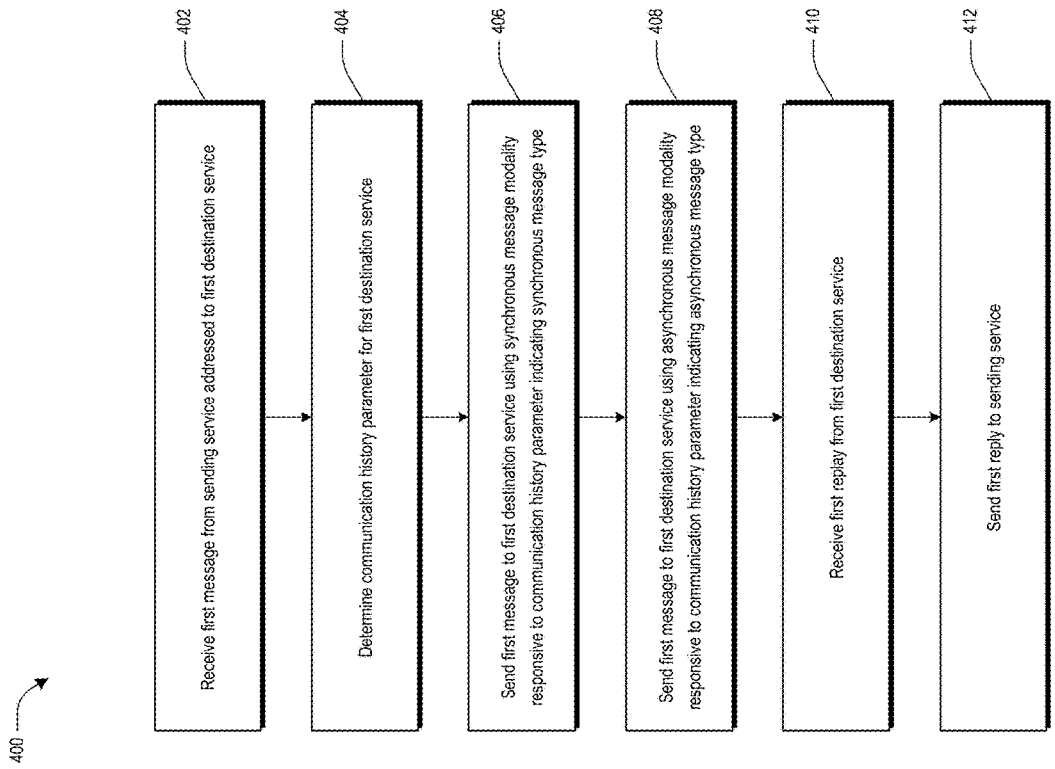
FIG. 4 is a flow chart illustrating an example method for sending messages, according to some embodiments.

FIG. 4 is a flow chart illustrating an example method 400 for sending messages, according to some embodiments. At 402, a first message addressed to a first destination service is received from a sending service. At 404, A communication history parameter is determined for the first destination service. At 406, the first message is sent to the first destination service using a synchronous message modality responsive to the communication history parameter indicating a synchronous message type. At 408, the first message is sent to the first destination service using an asynchronous message modality responsive to the communication history parameter indicating an asynchronous message type. At 410, a first reply from the first destination service is received. At 412, the first reply is sent to the sending service. Sending the first message to the first destination service using the synchronous message modality comprises waiting for a first reply to be received from the first destination service for a predetermined time interval. Sending the first message to the first destination service using the asynchronous message modality comprises storing first identification data associated with the first message in a correlation data store, receiving the first reply from the first destination service, and determining whether the first reply is associated with the first message based on the identification data.

Figure 5:
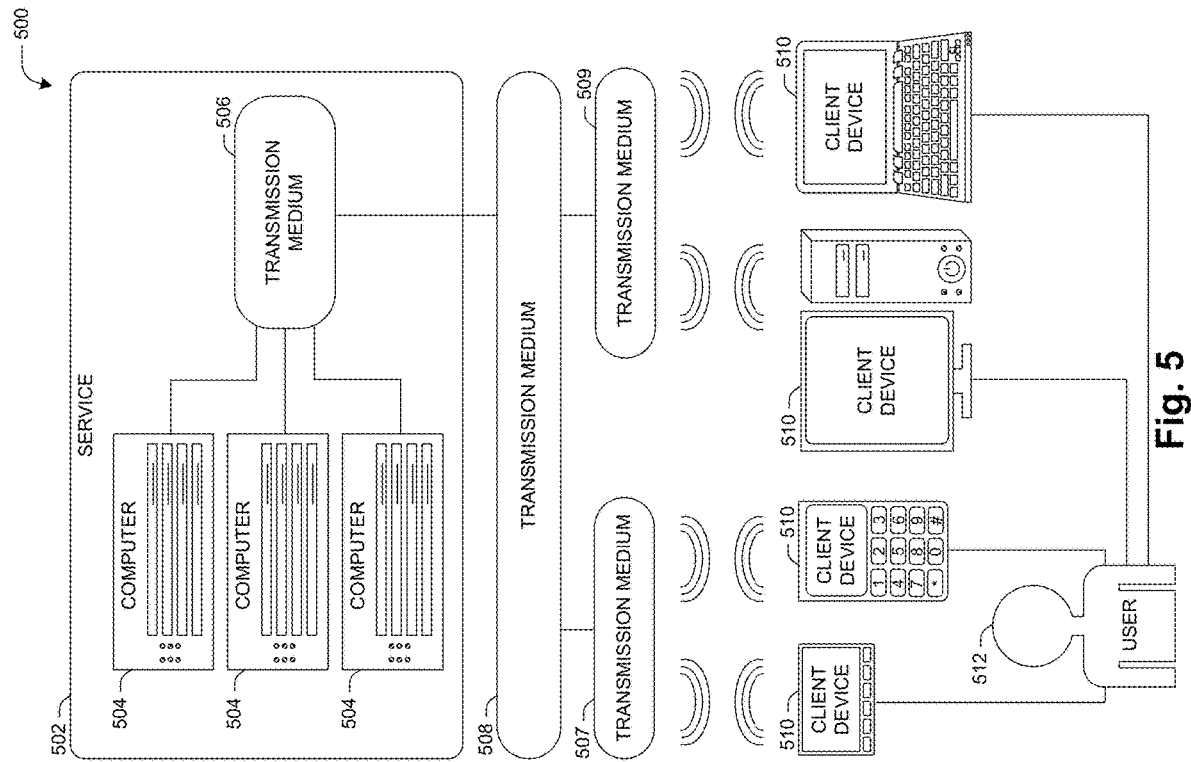
FIG. 5 is an illustration of a scenario involving various examples of transmission mediums that may be used to communicatively couple computers and clients.

FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the computers 504 and the client devices 510 may communicate over various types of transmission mediums.

Figure 6:
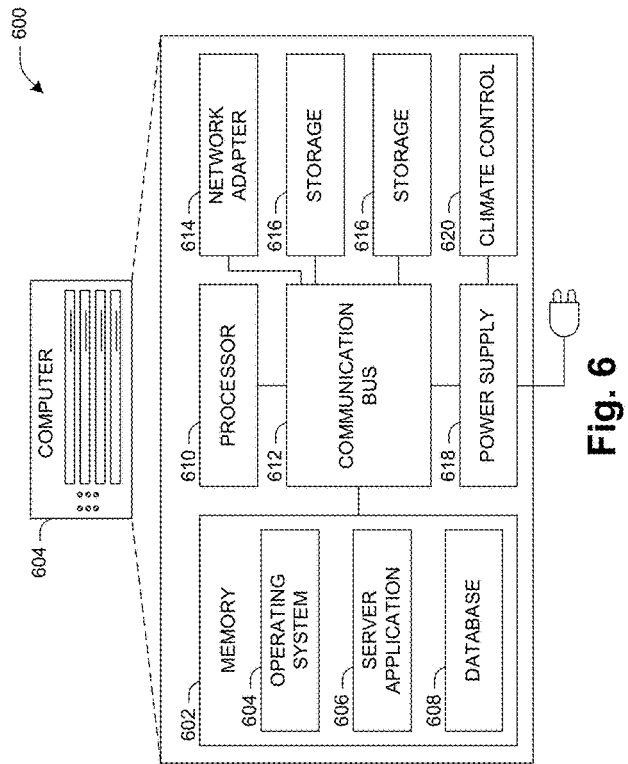
FIG. 6 is an illustration of a scenario involving an example configuration of a computer that may utilize and/or implement at least a portion of the techniques presented herein.

FIG. 6 presents a schematic architecture diagram 600 of a computer 604 that may utilize at least a portion of the techniques provided herein. Such a computer 604 may vary widely in configuration or capabilities, alone or in conjunction with other computers, in order to provide a service such as the service 502.

The computer 604 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 504 may comprise memory 602 storing various forms of applications, such as an operating system 604; one or more computer applications 606; and/or various forms of data, such as a database 608 or a file system. The computer 604 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 604 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 604 with at least one other computer. Other components that may optionally be included with the computer 604 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 618 that supplies and/or regulates power for the other components. The computer 604 may provide power to and/or receive power from another computer and/or other devices. The computer 604 may comprise a shared and/or dedicated climate control unit 620 that regulates climate properties, such as temperature, humidity, and/or airflow. Many such computers 604 may be configured and/or adapted to utilize at least a portion of the techniques presented herein.

Figure 7:
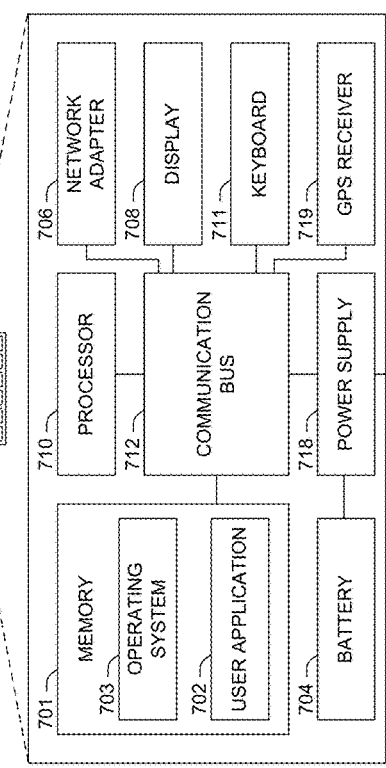
FIG. 7 is an illustration of a scenario involving an example configuration of a client that may utilize and/or implement at least a portion of the techniques presented herein.

FIG. 7 presents a schematic architecture diagram 700 of a client device 710 whereupon at least a portion of the techniques presented herein may be implemented. Such a client device 710 may vary widely in configuration or capabilities, in order to provide a variety of functionality to a user such as the user 512. The client device 710 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 709 that process instructions. The one or more processors 709 may optionally include a plurality of cores; one or more coprocessors, such as a mathematics coprocessor or an integrated graphical processing unit (GPU); and/or one or more layers of local cache memory. The client device 710 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 712 that interconnect the processor 709, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 718 that supplies and/or regulates power for other components, and/or a battery 704 that stores power for use while the client device 710 is not connected to a power source via the power supply 718. The client device 710 may provide power to and/or receive power from other client devices.

Figure 8:
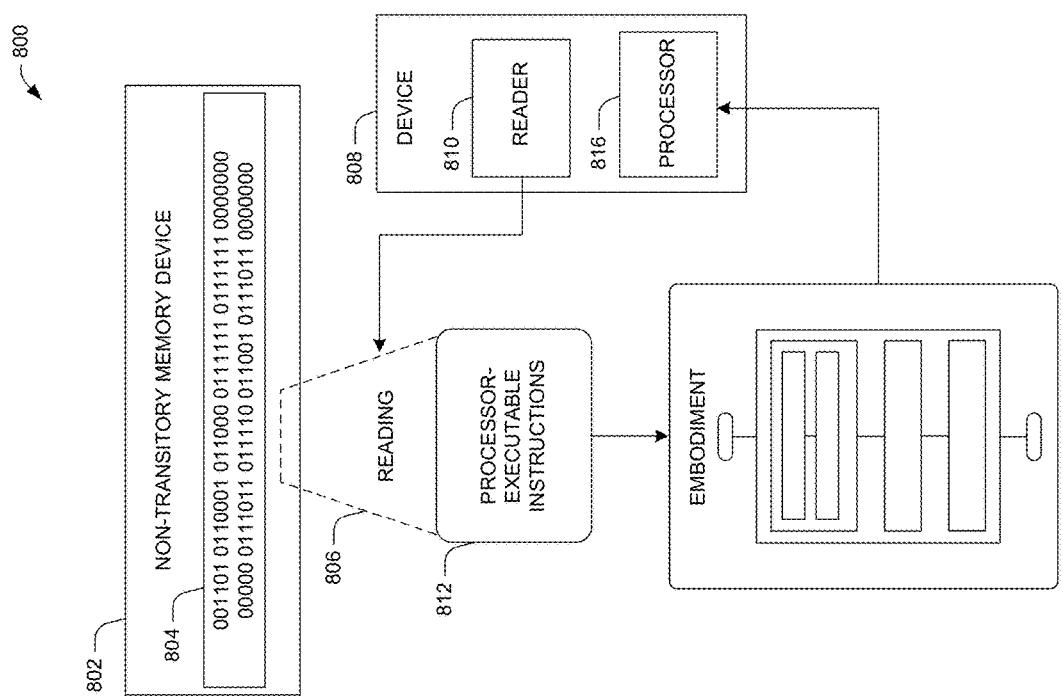
FIG. 8 is an illustration of a scenario featuring an example non-transitory machine readable medium in accordance with one or more of the provisions set forth herein.

FIG. 8 is an illustration of a scenario 800 involving an example non-transitory machine-readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 802 stores machine-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A communication system, comprising:
   a decision/response module configured to:
      receive a first message from a computer-implemented sending service for sending one or more requests and addressed to a computer-implemented first destination service for receiving one or more requests,
      determine a communication history parameter for the first message, and
      responsive to receiving a first reply from the first destination service, sending the first reply to the sending service;
   a synchronous communication module configured to:
      receive the first message from the decision/response module responsive to the communication history parameter indicating a synchronous message type,
      send the first message to the first destination service,
      send the first reply to the decision/response module responsive to receiving the first reply from the first destination service within a first predetermined time interval, and
      identify a first error condition responsive to not receiving the first reply from the first destination service within the first predetermined time interval; and
   an asynchronous communication module configured to:
      receive the first message from the decision/response module responsive to the communication history parameter indicating an asynchronous message type,
      store first identification data associated with the first message in a correlation data store,
      receive the first reply from the first destination service,
      determine whether the first reply is associated with the first message based on the first identification data, and
      send the first reply to the decision/response module responsive to determining that the first reply is associated with the first message.

2. The communication system of claim 1, wherein:
the synchronous communication module is configured to store the first message in a retry data store responsive to identifying the first error condition; and
the system comprises:
   a retry handler configured to retrieve the first message from the retry data store, generate a retry tracking parameter for the first message, and resend the first message to the decision/response module based on the retry tracking parameter.

3. The communication system of claim 2, wherein:
the retry handler is configured to send a fault message to the decision/response module based on the retry tracking parameter indicating a predetermined number of retry failures; and
the decision/response module is configured to send the fault message to the sending service.

4. The communication system of claim 1, wherein:
the decision/response module comprises an endpoint profile model indicating communication metrics for the first destination service; and
the synchronous communication module is configured to send the first error condition to the decision/response module.

5. The communication system of claim 1, wherein:
the asynchronous communication module is configured to identify a second error condition and store the first message a retry data store responsive to not receiving an acknowledge receipt from the first destination service regarding receipt of the first message; and
the system comprises:
   a retry handler configured to retrieve the first message from the retry data store, generate a retry tracking parameter for the first message, and resend the first message to the decision/response module based on the retry tracking parameter.

6. The communication system of claim 5, wherein:
the retry handler is configured to send a fault message to the decision/response module based on the retry tracking parameter indicating a predetermined number of retry failures; and
the decision/response module is module is configured to send the fault message to the sending service.

7. The communication system of claim 5, wherein:
the decision/response module comprises an endpoint profiler configured to generate a communication metric for the first destination service;
the asynchronous communication module is configured to send the second error condition to the endpoint profiler; and
the endpoint profiler is configured to update the communication metric for the first destination service based on the first error condition.

8. The communication system of claim 1, wherein:
the decision/response module comprises an endpoint profiler configured to generate a communication metric for the first destination service;
the asynchronous communication module is configured to a first communication successful indicator to the endpoint profiler responsive to receiving an acknowledge receipt from the first destination service regarding receipt of the first message;
the synchronous communication module is configured to a second communication successful indicator to the endpoint profiler responsive to receiving an acknowledge receipt from the first destination service regarding receipt of the first message; and
the endpoint profiler is configured to update the communication metric for the first destination service based on at least one of the first communication successful indicator or the second communication successful indicator.

9. A method, comprising:
receiving a first message from a computer-implemented sending service for sending one or more requests and addressed to a computer-implemented first destination service for receiving one or more requests;
determining a communication history parameter for the first destination service;
sending the first message to the first destination service using a synchronous message modality responsive to the communication history parameter indicating a synchronous message type;
sending the first message to the first destination service using an asynchronous message modality responsive to the communication history parameter indicating an asynchronous message type;
receiving a first reply from the first destination service; and
sending the first reply to the sending service, wherein:
   sending the first message to the first destination service using the synchronous message modality comprises waiting for the first reply to be received from the first destination service for a predetermined time interval, and
   sending the first message to the first destination service using the asynchronous message modality comprises storing first identification data associated with the first message in a correlation data store, receiving the first reply from the first destination service, and determining whether the first reply is associated with the first message based on the first identification data.

10. The method of claim 9, comprising:
storing the first message in a retry data store responsive to at least one of failing to receive the first reply from the first destination service within the predetermined time interval using the synchronous message modality or failing to receive an acknowledge receipt from the first destination service regarding receipt of the first message using the asynchronous message modality;
retrieving the first message from the retry data store;
generating a retry tracking parameter for the first message; and
resending the first message to the first destination service based on the retry tracking parameter and the communication history parameter.

11. The method of claim 10, comprising:
updating the communication history parameter prior to resending the first message to the first destination service.

12. The method of claim 9, wherein:
determining the communication history parameter for the first message comprises employing an endpoint profile model indicating communication metrics for the first destination service to determine the communication history parameter for the first message; and
the method comprises:
   updating the endpoint profile model based on successful communications or unsuccessful communications using the synchronous message modality.

13. The method of claim 9, wherein:
determining the communication history parameter for the first message comprises employing an endpoint profile model indicating communication metrics for the first destination service to determine the communication history parameter for the first message; and the method comprises:

updating the endpoint profile model based on successful communications or unsuccessful communications using the asynchronous message modality.

14. The method of claim 9, comprising:

identifying a first error condition responsive to not receiving the first reply from the first destination service within the first predetermined time interval while using the synchronous message modality; and sending the first error condition to the sending service.

15. The method of claim 9, comprising:

identifying a first error condition responsive to not receiving an acknowledge receipt from the first destination service regarding receipt of the first message; and sending the first error condition to the sending service.

16. A non-transitory computer-readable medium, storing instructions thereon that when executed by a processor cause the processor to:

receive a first message from a computer-implemented sending service for sending one or more requests and addressed to a computer-implemented first destination service for receiving one or more requests;

determine a communication history parameter for the first message;

send the first message to the first destination service using a synchronous message modality responsive to the communication history parameter indicating a synchronous message type;

send the first message to the first destination service using an asynchronous message modality responsive to the communication history parameter indicating an asynchronous message type;

receive a first reply from the first destination service; and send the first reply to the sending service, wherein:

sending the first message to the first destination service using the synchronous message modality comprises waiting for the first reply to be received from the first destination service for a predetermined time interval, and sending the first message to the first destination service using the asynchronous message modality comprises storing first identification data associated with the first message in a correlation data store, receiving the first reply from the first destination service, and determining whether the first reply is associated with the first message based on the first identification data.

17. The non-transitory computer-readable medium of claim 16, wherein the processor is to:

store the first message in a retry data store responsive to at least one of failing to receive the first reply from the first destination service using the synchronous message modality or failing to receive an acknowledge receipt from the first destination service regarding receipt of the first message using the asynchronous message modality;

retrieve the first message from the retry data store;

generate a retry tracking parameter for the first message; and resend the first message to the first destination service based on the retry tracking parameter and the communication history parameter.

18. The non-transitory computer-readable medium of claim 17, wherein the processor is to:

determine the communication history parameter for the first message by employing an endpoint profile model indicating communication metrics for the first destination service to determine the communication history parameter for the first message;

update the endpoint profile model based on successful communications or unsuccessful communications using the synchronous message modality; and update the endpoint profile model based on successful communications or unsuccessful communications using the asynchronous message modality.

19. The non-transitory computer-readable medium of claim 17, wherein the processor is to:

identify a first error condition responsive to not receiving the first reply from the first destination service within a first predetermined time interval while using the synchronous message modality; and send the first error condition to the sending service.

20. The non-transitory computer-readable medium of claim 17, wherein the processor is to:

identify a first error condition responsive to not receiving an acknowledge receipt from the first destination service regarding receipt of the first message; and send the first error condition to the sending service.

* * * * *